United States Patent
Miller et al.

(10) Patent No.: US 8,083,156 B2
(45) Date of Patent: Dec. 27, 2011

(54) DISPERSION LANCE AND SHIELD FOR DISPERSING A TREATING AGENT INTO A FLUID STREAM

(75) Inventors: Scott D. Miller, Austin, TX (US); Mark A. Denlinger, Leander, TX (US)

(73) Assignee: URS Corporation, San Francisco, CA (US)

( * ) Notice: Subject to any disclaimer, the term of this patent is extended or adjusted under 35 U.S.C. 154(b) by 397 days.

(21) Appl. No.: 12/455,149

(22) Filed: May 28, 2009

(65) Prior Publication Data

US 2009/0293721 A1    Dec. 3, 2009

Related U.S. Application Data

(63) Continuation-in-part of application No. 12/152,654, filed on May 15, 2008, now Pat. No. 8,011,601.

(60) Provisional application No. 60/930,703, filed on May 18, 2007.

(51) Int. Cl.
*B05B 7/06* (2006.01)

(52) U.S. Cl. .......... 239/10; 239/429; 239/432; 261/115; 366/101; 366/167.1; 366/174.1; 366/337; 366/338; 366/340

(58) Field of Classification Search .............. 239/10, 239/429, 432; 261/115; 366/101, 167.1, 366/174.1, 337, 338, 340
See application file for complete search history.

(56) References Cited

U.S. PATENT DOCUMENTS

| | | | |
|---|---|---|---|
| 3,879,021 A * | 4/1975 | Riley .................... | 366/137.1 |
| 4,164,375 A | 8/1979 | Allen | |
| 4,466,100 A | 8/1984 | Broadwell | |
| 4,498,786 A | 2/1985 | Ruscheweyh | |
| 4,527,903 A | 7/1985 | Ruscheweyh | |
| 4,564,298 A * | 1/1986 | Gritters et al. ............. | 366/173.2 |
| 4,633,909 A * | 1/1987 | Louboutin et al. ............ | 137/888 |
| 4,753,535 A * | 6/1988 | King .......................... | 366/337 |
| 4,899,772 A | 2/1990 | Rao | |
| 5,308,043 A | 5/1994 | Floyd et al. | |
| 5,456,533 A | 10/1995 | Streiff et al. | |
| 5,667,582 A | 9/1997 | Ziegler et al. | |
| 5,839,828 A | 11/1998 | Glanville | |
| 5,866,910 A | 2/1999 | Cooke et al. | |
| 6,135,629 A * | 10/2000 | Dohmann ................. | 366/181.5 |
| 6,245,285 B1 | 6/2001 | Dry et al. | |
| 6,398,842 B2 | 6/2002 | Dunne | |
| 6,989,126 B2 | 1/2006 | Leigh | |
| 7,383,850 B2 * | 6/2008 | Buzanowski et al. ............ | 137/1 |

(Continued)

*Primary Examiner* — Robert J Hill, Jr.
*Assistant Examiner* — Christopher P Jones
(74) *Attorney, Agent, or Firm* — Klauber & Jackson LLC

(57) ABSTRACT

A dispersion apparatus for dispersing a treating agent into a fluid treatment system that includes a flow duct in which a fluid stream flowing through the duct is mixed with the treating agent. The apparatus is based on a multi-pipe lance positioned in the stream flow, where each pipe supplies a minimum of feed discharge nozzles (typically one to four), and the individual pipes branch off from the same location. Use of the multi-pipe lance, in combination with a suitable baffle, results in better overall dispersion/distribution of the injected medium by surface area. By improving the surface area distribution, better utilization of the injected sorbent can be achieved. The baffle acts to generate a low pressure zone on its downstream side and creates a high-intensity turbulence plume in the fluid. The orifices of the pipe are located to inject the treating agent into the turbulence plume to better distribute and intermix the injected treating agent into the surrounding fluid.

33 Claims, 13 Drawing Sheets

U.S. PATENT DOCUMENTS

| | | | |
|---|---|---|---|
| 7,770,564 B2 * | 8/2010 | Emerick et al. | 123/568.17 |
| 7,896,264 B2 * | 3/2011 | Eicher et al. | 239/590 |
| 2002/0031046 A1 * | 3/2002 | Schneider et al. | 366/181.5 |
| 2010/0243953 A1 * | 9/2010 | Livshits | 252/182.11 |

* cited by examiner

FIG. 5
FIG. 6
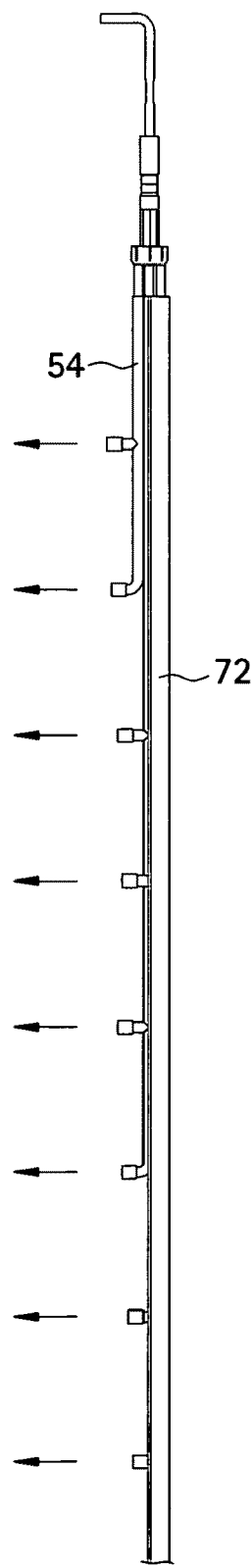
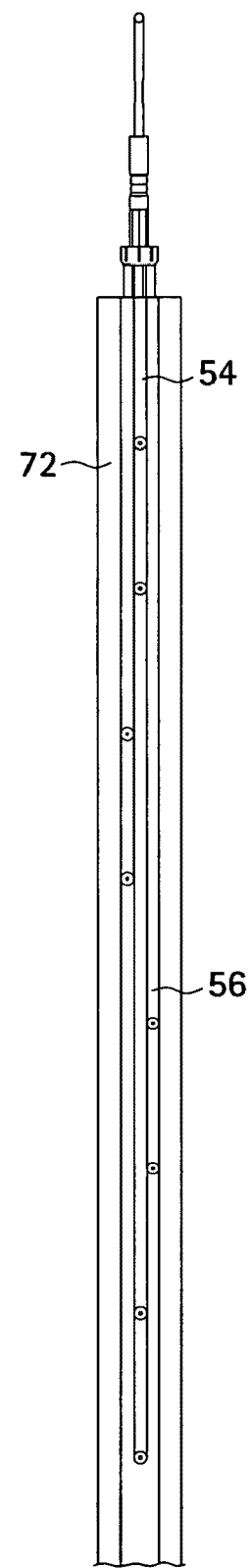

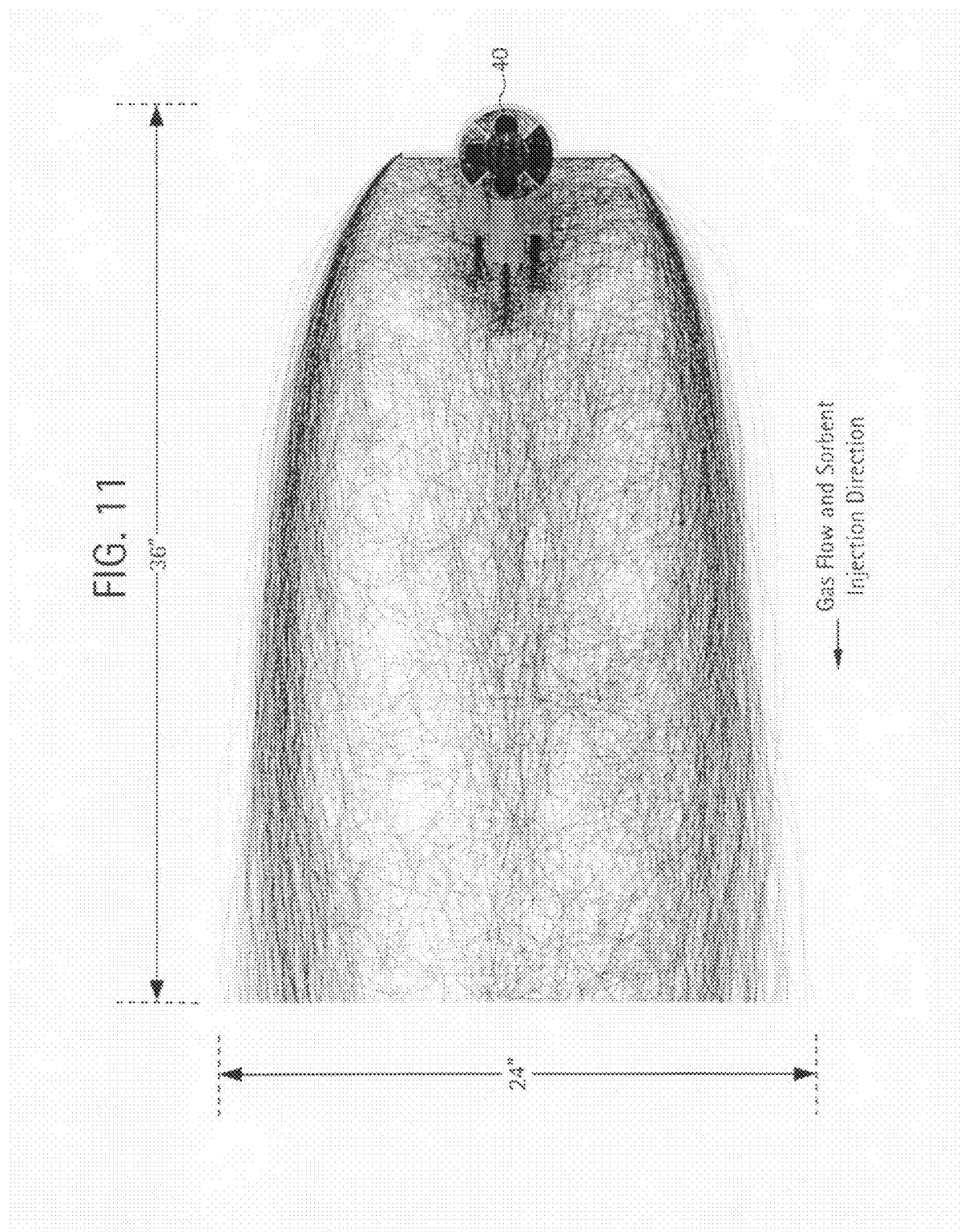

Figure 1:
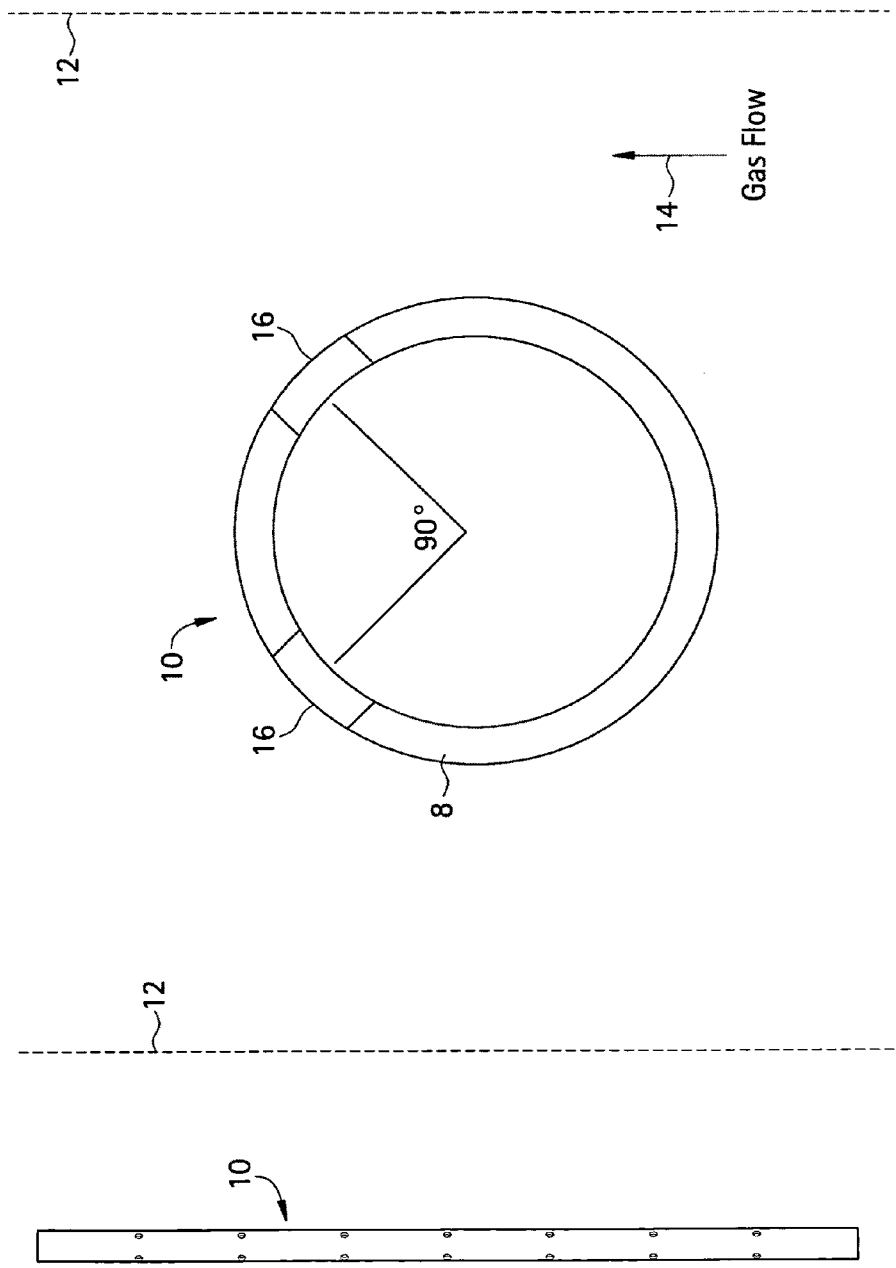
Figure 2:
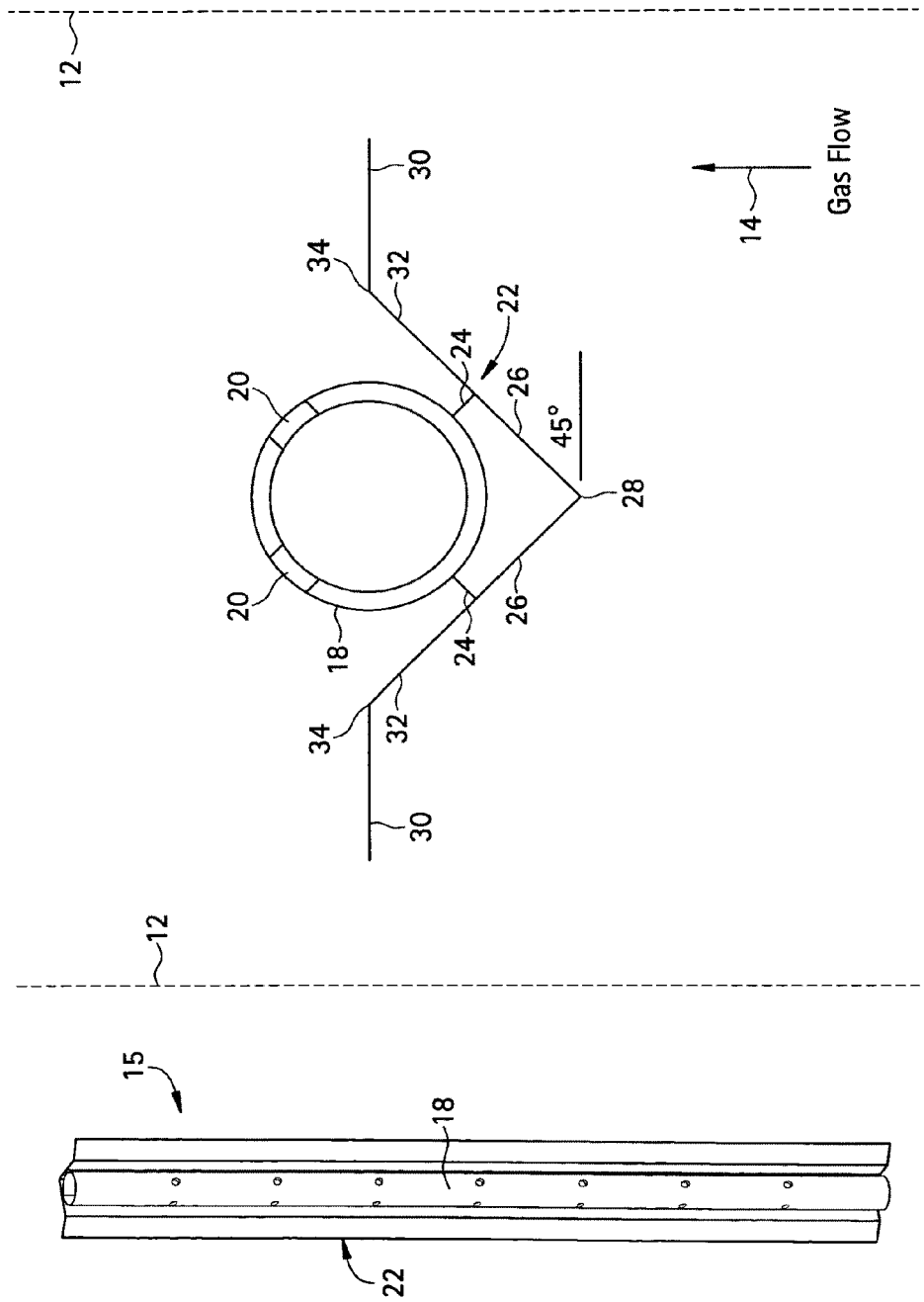
Figure 3:
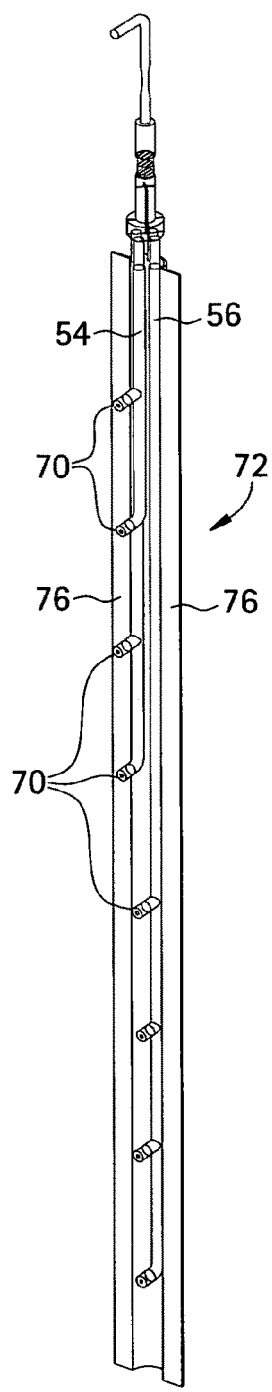
Figure 4:
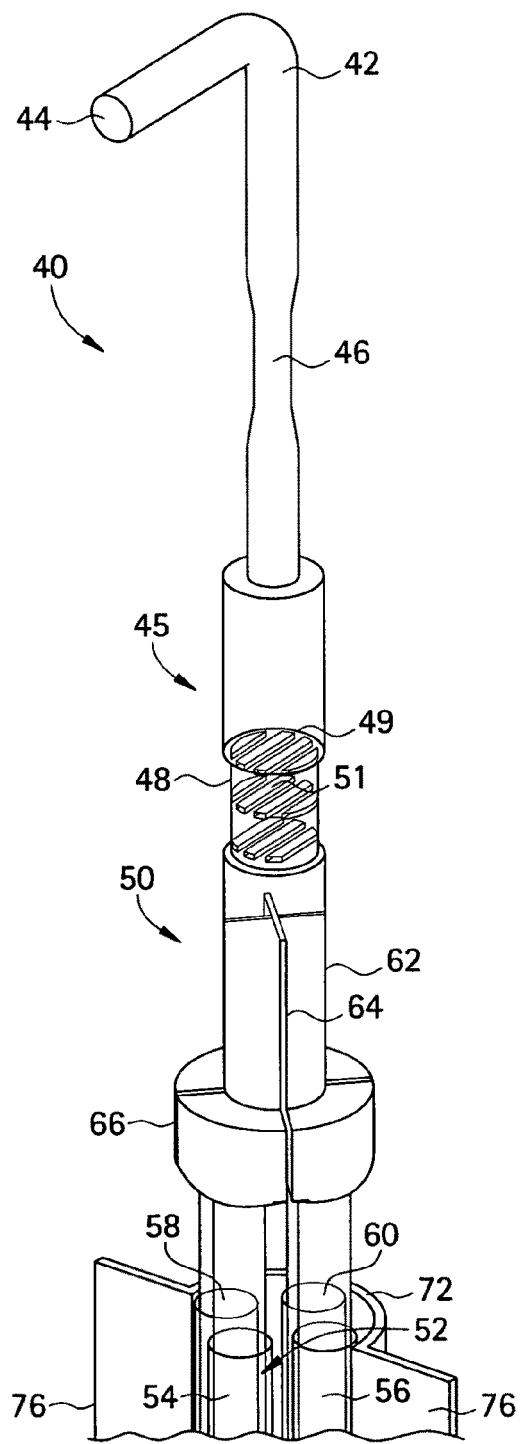
Figure 7:
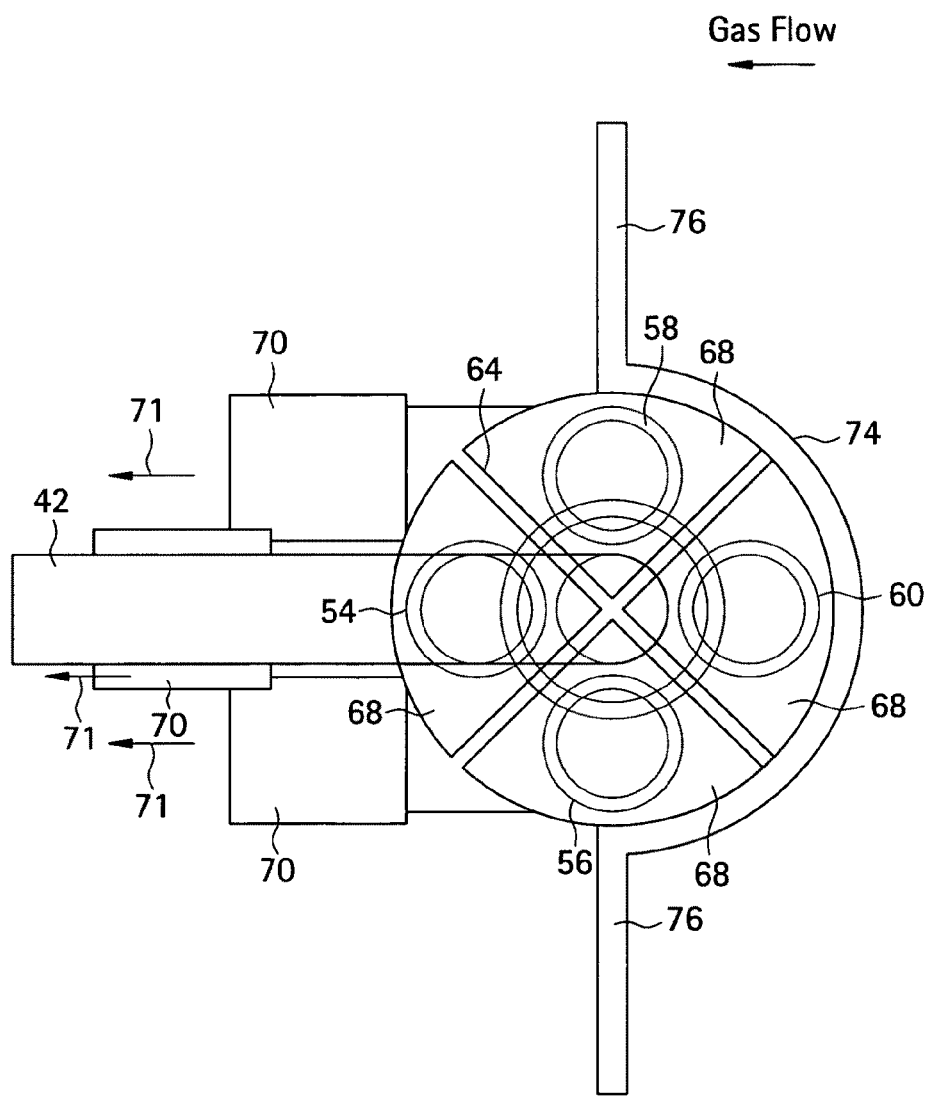

Surface areas by particle sizes for Prior Art Lance of Figs 1 and 1A at 10 ft. downstream of injection plane 1 micron 3 micron 11 micron 30 micron 46 micron 87 micron Surface areas by particle sizes for Prior Art Lance of Figs 3 to 7 Lance at 10 ft. downstream of injection plane 1 micron 3 micron 11 micron 30 micron 46 micron 87 micron In duct particle mixing 10 ft. downstream of
injection plane (all particle sizes)

Prior Art Lance
of Figs 1 and 1A

Multi-Pipe Dispersion Lance
Of Figs 3 to 7

DISPERSION LANCE AND SHIELD FOR DISPERSING A TREATING AGENT INTO A FLUID STREAM

RELATED APPLICATION

This application is a continuation-in-part of U.S. patent application Ser. No. 12/152,654, filed May 15, 2008, now U.S. Pat. No. 8,011,601. The latter claimed priority from U.S. Provisional Patent Application No. 60/930,703 filed May 18, 2007.

FIELD OF INVENTION

This invention relates generally to apparatus and methods for fluid treatment, and more specifically relates to apparatus for injecting a treating agent into a fluid stream while generating enhanced fluid phase turbulence to better distribute and intermix the injected treating agent into the surrounding fluid.

BACKGROUND OF INVENTION

During the course of treating an acid or other gas, in order for example to control the atmospheric emission of polluting contaminants such as sulfur oxides, it is common as one step of the process to disperse solid particles of a treating agent such as a carbonate into the gas in order to react with or adsorb the undesired component. In order to do this a dispersion lance or other device or collection of devices may be used, the function of which is to disperse the solid particles of treating agent into the gaseous stream. Nozzles or collections of particle ejection nozzles can be used for this purpose. Since, however, simple ejection of the particles from such nozzles is not very effective in generating thorough mixing of the particles with the gas stream, it is also known to use baffles, usually positioned directly downstream of the injection point to encourage turbulence, thereby enhancing the mixing of particles with the gas stream. These prior devices and apparatus arrangements, however, have been of only limited efficacy, often because the turbulence generated has not been effective enough to break up the ejected particle streams, which to the contrary are commonly found, when examined, to advance from their injection points as rather distinct linear streams as they move into the surrounding ambient gas stream. Accordingly, a need has existed for an injection lance and baffle construction which is fully able to produce the highly turbulent conditions required for full and effective dispersion and mixing into the gas stream of the injected particles of the treating agent.

Similar considerations as described above for the case of injection of solid particles into a gas flow, arise where an injection lance and baffle construction is used for injecting liquids or gaseous treating agents into a fluid flow of a gas, or injection of solid particles, liquids, or gases into a flow of a liquid phase. Such injection can, of course, be for other well-known purposes, i.e. not necessarily for eliminating or reducing contaminating sulfurous and/or other noxious components from flue gases or the like.

In our aforementioned Ser. No. 12/152,654 (hereinafter referred to as '654) application, apparatus is disclosed which is capable of considerably alleviating the cited difficulties of the prior art. Specifically, a dispersion lance is provided for use in combination with a fluid treatment system of the type which includes a flow duct in which a fluid stream is mixed with a treating agent. The dispersion lance includes a pipe mounted in the duct with its axis approximately transverse to the direction of the fluid stream flow, the pipe having a series of openings along its length for injecting a treating agent supplied to the pipe into the fluid stream. A baffle extends lengthwise along the pipe, the baffle having a cross-section the central portion of which is V-shaped, with the apex of the V facing upstream of the fluid stream flow, and with generally flattened wing portions extending from the legs of the V beyond the sides of the pipe in a direction where they transversely intersect the stream flow. The baffle acts to generate a low pressure zone on its downstream side, which enhances turbulence in the fluid. The orifices of the pipe are located to inject the treating agent into the low pressure zone to better distribute and intermix the injected treating agent into the surrounding fluid.

The wings of the baffle form an angle of less than 180° with respect to the legs of the central portion, and the apex of the central portion V generally subtend an angle of from about 30 to 135°, with an angle of about 90° being typical. The wings can have a generally rectangular shape, and may be provided with notches on their trailing edge.

In a typical application as will be described below, the invention is applicable to the case of injection of solid particles into a gas flow. A particularly valuable such use is found in the aforementioned process of dispersing solid particles of a sorbent treating agent such as a carbonate into a flue gas in order to react with or adsorb a component of the gas to avoid its discharge into the environment, and/or to recover the component for other uses. In the following, this particular use of the invention will be emphasized. However, it will be appreciated that the invention is also applicable to the environments where an injection lance and baffle construction is to be used for injecting liquids or gaseous treating agents into a gaseous flow; or where an injection lance and baffle construction is to be used for injection of solid particles, or liquids or gases, into a flow of a liquid phase.

SUMMARY OF INVENTION

Although the lance construction in our '654 application results in much improved mixing relative to the prior art lance, the overall distribution of the surface area of the injected treating agent (such as the exemplary sorbent) was found to not be markedly uniform along the length of the lance. Through further analysis of the solids dispersion of the '654 lance, the present inventors discovered that the mass and the surface area of the particles emitted from the lance were biased towards its far end (due to the momentum of the particles). This is a problem that calls for solution, in that for mass-transfer-limited reactions, the removal efficiency of an injected sorbent is a function of the distribution of surface area of the injected sorbent in the gas-carrying duct.

To address this issue, we have now developed a multi-pipe lance, where each pipe supplies a minimum of feed discharge nozzles (typically one to four), and the individual pipes branch off from the same location or are otherwise fed with the sorbent or other treating agent to be dispersed. We have found that use of the multi-pipe lance in combination with a suitable baffle, results in better overall dispersion/distribution of the injected medium by surface area. By improving the surface area distribution, better utilization of the injected sorbent can be achieved The multi-pipe lance retains the bulk, in-duct mixing properties of the '654 lance, and improves the distribution of surface area of the injected sorbent along the length of the lance. The improved surface area distribution is accomplished through the use of a dispersion lance mounted in the gas-carrying duct with its axis approximately transverse to the direction of the fluid stream flow, the lance having a treating agent feed section, and a plurality of parallel pipes extending from said section, each said pipe having one or more feed discharge nozzles along its length for injecting the treating agent supplied to said pipe into the fluid stream. A baffle extends lengthwise along the upstream side of the lance, the baffle preferably being formed as a partial cylindrical surface, such as the surface of a semi-cylinder. The convex side of the cylindrical surface faces upstream of the fluid stream flow, and adjoins generally flattened wing portions which extend from the lateral edges of the cylindrical surface to beyond the lateral sides of the multiple pipes, where the wings transversely intersect the stream flow. The baffle acts to generate a low pressure zone on the downstream sides of the nozzle-feed pipes, which enhances turbulence in the gas. The feed discharge nozzles of the nozzle-feed pipes are located to inject the treating agent into the low pressure zone to better distribute and intermix the injected treating agent into the surrounding gas stream.

The said treating agent feed section receives feed from an inlet supply line, and includes successively in the downstream direction: a venturi section, a mixing bar section, and a feed splitter section. The venturi section redirects sorbent particles away from the walls of the main feed pipe downstream of any bends in the inlet supply line. This feature is desirable when the supply of sorbent to the lance is not uniform, which it usually will not be, and has the intended purpose of improving the performance of the mixing bar section.

The mixing bar section serves to spread the sorbent particles uniformly across the main feed pipe cross-section in preparation for the splitter vane section. The feed splitter section allocates the uniformly distributed sorbent particles evenly into separate compartments each of which leads into one of the separate nozzle-feed pipes. The nozzle-feed pipes transfer the uniformly allocated sorbent particles to the discharge nozzles. There can be one or more discharge nozzles per feed pipe, though the number is preferably limited to the minimal required to achieve the desired spray coverage. Each discharge nozzle has an orifice opening size sufficiently small to balance the pressure drop evenly across the separate feed pipes. This serves to ensure that the pneumatic air and sorbent particles it is conveying are allocated relatively evenly between the separate feed pipes. The numbers of discharge nozzles per pipe, as well as the distance between nozzles on a single pipe, are both limited in order to minimize the bias in the mass flow rate and total surface area of solids emitted from each nozzle. The distribution of injected sorbent particles along the length of the lance can be modified to match any potential uneven distribution of gas flow along the length of the lance by adjusting the nozzle orifice opening sizes of individual nozzles and by adjusting the positions of the nozzles along the length of the lance.

The baffle preferably extends below the last nozzle for a distance approximately equal to the distance between successive discharge nozzles. Due to the flue gas flow patterns in the wake of the baffle, the excess length of the baffle (past the last nozzle) serves to distribute additional sorbent beyond the last discharge nozzle.

BRIEF DESCRIPTION OF DRAWINGS

The invention is diagrammatically illustrated, by way of example, in the drawings appended hereto, in which:

FIGS. 1 and 1A are respectively schematic transverse and plan sectional views of a typical prior art dispersion lance, which is positioned in a duct carrying a gas stream, which is being treated with a particulate injected from the lance;

FIGS. 2 and 2A are respectively schematic transverse and plan sectional views of a dispersion lance and baffle in accordance with the invention of our '654 application, which are positioned in a duct carrying a gas stream which is being treated with a particulate injected from the lance;

FIG. 3 is a schematic partially broken-away perspective view of a multi-pipe dispersion lance and baffle in accordance with the invention;

FIG. 4 is an enlarged view of the upper portions of the FIG. 3 apparatus;

FIG. 5 is a side elevational view of the lance and baffle apparatus of FIGS. 3 and 4;

FIG. 6 is a front elevational view of the lance and baffle apparatus of FIGS. 3 and 4, looking at the apparatus from downstream of same;

FIG. 7 is a top plan view, schematic and partially broken away, of the lance and baffle apparatus of FIGS. 3 and 4;

FIG. 8 is a schematic broken-away perspective view showing typical injected sorbent particle tracks enabled by a pair of the prior art apparatus of FIGS. 1 and 1A;

FIG. 9 is a schematic broken-away perspective view showing typical injected sorbent particle tracks enabled by a pair of multi-pipe lance and baffle dispersion apparatus of the type shown in FIGS. 3 through 7;

FIG. 10 is a schematic top plan view illustrating the injected sorbent particle tracks for the prior art lance of FIGS. 1 and 1A;

FIG. 11 is a schematic top plan view illustrating the injected sorbent particle tracks for the apparatus of the invention shown in FIGS. 3 through 7;

FIGS. 12A through 12F schematically depict cross-sectional views taken 10 ft downstream of the injection plane for the prior art lance of FIGS. 1 and 1A, and show distribution and mixing of the injected sorbent particle surface area by particle size at the said downstream position;

FIGS. 13A through 13F schematically depict cross-sectional views taken 10 ft downstream of the injection plane for the apparatus of the invention as in FIGS. 3 through 7, and show the distribution and mixing of the injected sorbent particle surface area by particle size at the said downstream position;

FIGS. 14A and 14B schematically depict cross-sectional views taken 10 ft downstream from the prior art lance of FIGS. 1 and 1A, and from the multi-pipe lance of the invention as in FIGS. 3 through 7, and show for each the total distribution and mixing of injected sorbent particle surface area for all particle sizes at the said downstream position; and FIG. 15 is a graph depicting the normalized pneumatic air and sorbent surface area distribution along the length of lance for a prior art lance as in FIGS. 1 and 1A, and for the multi-pipe lance and baffle apparatus of the invention as in FIGS. 3 through 7.

DESCRIPTION OF PREFERRED EMBODIMENT

In FIGS. 1 and 1A schematic transverse and plan sectional views of a typical prior art dispersion lance 10, which is positioned in a duct 12 carrying a gas stream flow 14 which is being treated with a particulate ejected from the lance. The position of the lance within duct 12 is not shown to scale; rather the duct 12 and its actual wall spacing from lance 10 is merely intended to be suggested by the dotted lines used here—and as well in FIG. 2A. Also while dimensions and certain angles are shown in FIGS. 1, 1A, 2 and 2A, these are cited for illustration only and are not in any way intended to be limiting of the invention. The lance 10 comprises a pipe 8 which is mounted in duct 12 by means not shown. Pipe 8 has two parallel lines of openings 16 along its length. As seen in FIG. 1A the parallel lines of openings 16 are at the downstream facing side of pipe 8, and are oriented so that axial openings in opposed lines are at an angle of about 90° with respect to each other. The particulate treating agent to be dispersed into the flowing gas stream 14 is provided to pipe 8 and the particles are then injected into the gas stream from openings 16. A pressurized carrier gas can be provided to pipe 8 with the particles to enable their ejection, or other means can be used to generate forces for ejection of the particles through openings 16.

In FIGS. 2 and 2A schematic transverse and plan sectional views appear of a dispersion lance and baffle in accordance with the '654 invention, which are similarly positioned in a duct 12 carrying a gas stream which is being treated with a particulate ejected from the lance. The pipe 18 is substantially similar to pipe 8 of FIGS. 1 and 1A, and is again provided with openings or orifices 20 arranged along two parallel lines extending along pipe 18. However unlike the prior art device, pipe 18 is associated with a baffle 22, which is mounted in any convenient manner in duct 12, including by being affixed to pipe 18 by supports 24. Pipe 18 and baffle 22 can be positioned in a vertical or horizontal orientation in duct 12, or otherwise depending on requirements and on duct geometry. Baffle 22 extends lengthwise along pipe 18, and has a cross-section the central portion 26 of which is V-shaped, with the apex 28 of the V facing upstream of the gas stream flow 14, and with generally flattened wing portions 30 extending from the legs 32 of the V beyond the lateral sides of pipe 18 in a direction where they transversely intersect the gas stream flow 14. The apex 28 of the V subtends an angle of about 90°, but more generally can be in the range of from about 30 to 135°. The V shape of the central portion 26 of baffle 22 can be modified so as to be rounded at its bottom to a concave curve (i.e. at the surface facing pipe 18), or even to the extent of defining a U shape as it partially encloses pipe 18. Wing portions 30 are seen to define a second V 34 with the legs 32. The included angle of second V 34 should be less than 180°. Wing portions 30 are typically flat rectangles as seen in FIG. 2, but they can also be modified, as for example by being provided with notches of various shapes on their trailing edges.

FIGS. 3 through 7 depict in simplified views the improved multi-pipe dispersion lance 40 and baffle 72 of the invention. FIGS. 3 through 7 are best considered simultaneously. Although the present invention is not in any way to be considered so limited, for purposes of concrete exemplification, the dispersion apparatus will be discussed especially in the case where it is being used for dispersing a sorbent treating agent into a flowing stream of flue gas in a duct such as has been described in connection with FIGS. 2 and 2A.

The lance 40 comprises a main feed inlet pipe 42, which receives the particulate treating agent such as calcium carbonate at inlet end 44 where it is carried by a pneumatic air or other gas flow. The treating agent feed section 45 receives the feed from inlet pipe 42, and includes successively in the downstream direction: a venturi section 46, a mixing bar section 48, and a feed splitter section 50. The feed thus passes successively through venturi section 46, then through mixing bar section 48, and to feed splitter section 50 which allocates the feed into the separate nozzle-feed pipes 52 which extend downwardly in parallel fashion. Four such feed pipes 54, 56, 58, and 60 are shown, but different pluralities of nozzle-feed pipes may be used consistent with needs of a given system.

The venturi section 46 redirects sorbent particles away from the walls of main feed pipe 42 downstream of any bends in the inlet supply line. This feature is desirable when the supply of sorbent to the lance is not uniform, which it usually will not be, and has the intended purpose of improving the performance of the mixing bar section 48.

The mixing bar section 48 includes a series of vertically spaced plates 49 each including spaced bars 51. Section 48 serves to spread the sorbent particles uniformly across the main feed pipe cross section in preparation for the feed splitter section 50. Section 50 includes an enlarged cylinder 62 in which is mounted splitter vanes 64 which also extend into the diametrically larger cylinder 66. The vanes 64 divide the section 50 into four compartments 68 (FIG. 7), each of which connects to one of the nozzle feed pipes 52. The splitter section 50 allocates the uniformly distributed sorbent particles evenly into compartments 68. The nozzle-feed pipes 52 transfer the uniformly allocated sorbent particles to the discharge nozzles 70 which are present along each of the nozzle-feed pipes. There can be one or more discharge nozzles per feed pipe, though the number is preferably limited to the minimal required to achieve the desired spray coverage. Each discharge nozzle 70 has an orifice opening size sufficiently small to balance the pressure drop evenly across the separate feed pipes. This serves to ensure that the pneumatic air and sorbent particles it is conveying are allocated relatively evenly between the separate feed pipes and nozzles. The number of discharge nozzles 70 per pipe, as well as the distance between nozzles on a single pipe, are both limited in order to minimize the bias in the mass flow rate and total surface area of solids emitted from each nozzle.

It will be seen from FIGS. 3, 5, and 6 that the separate nozzle-feed pipes 52 terminate at differing distances below the compartments 68, and that accordingly the nozzles 70 of each said pipe are at a portion of a given pipe where the nozzle discharges are not impeded by any of the remaining pipes.

A baffle 72 extends lengthwise along the upstream side of lance 40. Although the baffle can incorporate the V shape configuration of the baffle in FIGS. 2 and 2A, or a modification in which the V is rounded to a curve at its vertex, it has been found preferable for the baffle to be formed as a partial cylindrical surface 74 (FIG. 7), here as the surface of a semi-cylinder. The concave side of cylindrical surface 74 faces upstream of the fluid stream flow, and adjoins generally flattened wing portions 76 which extend from the lateral edges of the cylindrical surface to beyond the lateral sides of the multiple pipes, where the wings transversely intersect the stream flow. The baffle 72 acts to generate a low pressure zone on the downstream sides of the nozzle-feed pipes which enhances turbulence in the gas thereby enhancing mixing of the injected sorbent with the gas. The discharge nozzles 70 (FIG. 7) of the nozzle-feed pipes are located to inject the discharge 71 of treating agent into the low pressure zone to better distribute and intermix the injected treating agent into the surrounding gas stream. The bottom of baffle 72 preferably extends below the last nozzle of nozzle-feed pipes 52 for a distance approximately equal to the distance between successive discharge nozzles, whereby due to the flue gas flow patterns in the wake of the baffle, the excess length of the baffle past the last nozzle serves to distribute additional particles beyond the last discharge nozzle.

As will be better appreciated from the following studies, all of which were generated via Computational Fluid Dynamics modeling (CFD), the baffle 72 acts to markedly enhance gas phase turbulence to thereby better distribute and mix the injected sorbent particles into the surrounding gas flow.

The CFD Modeling basis in the studies was as follows:

Modeled a pair of vertical lances in a duct partition 9 ft-6 in tall and 12 ft-6 in wide.

Total Gas Flow in Duct Partition=396,000 acfm.

Average Gas Velocity in Duct=55.6 ft/sec
Gas Temperature=316° F.
Solids Particle Size Distribution for treating agent
   Sauter Mean Diameter=8.5 micron
   Volume Mean Diameter=23.3 micron
   Divided into 6 discrete sizes:

| | |
|---|---|
| 1 micron | 5% by volume |
| 3 micron | 5% |
| 11 micron | 40% |
| 30 micron | 40% |
| 46 micron | 5% |
| 87 micron | 5% |

Figure 8:
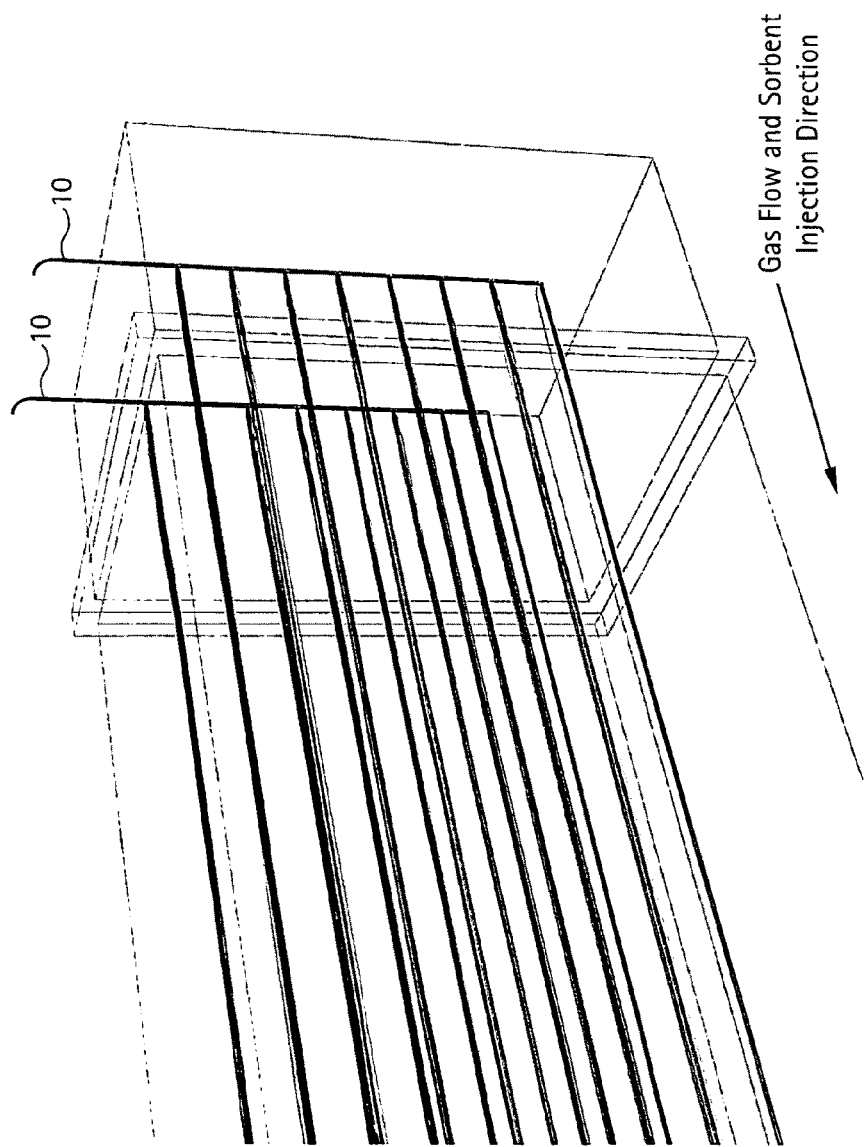
Figure 9:
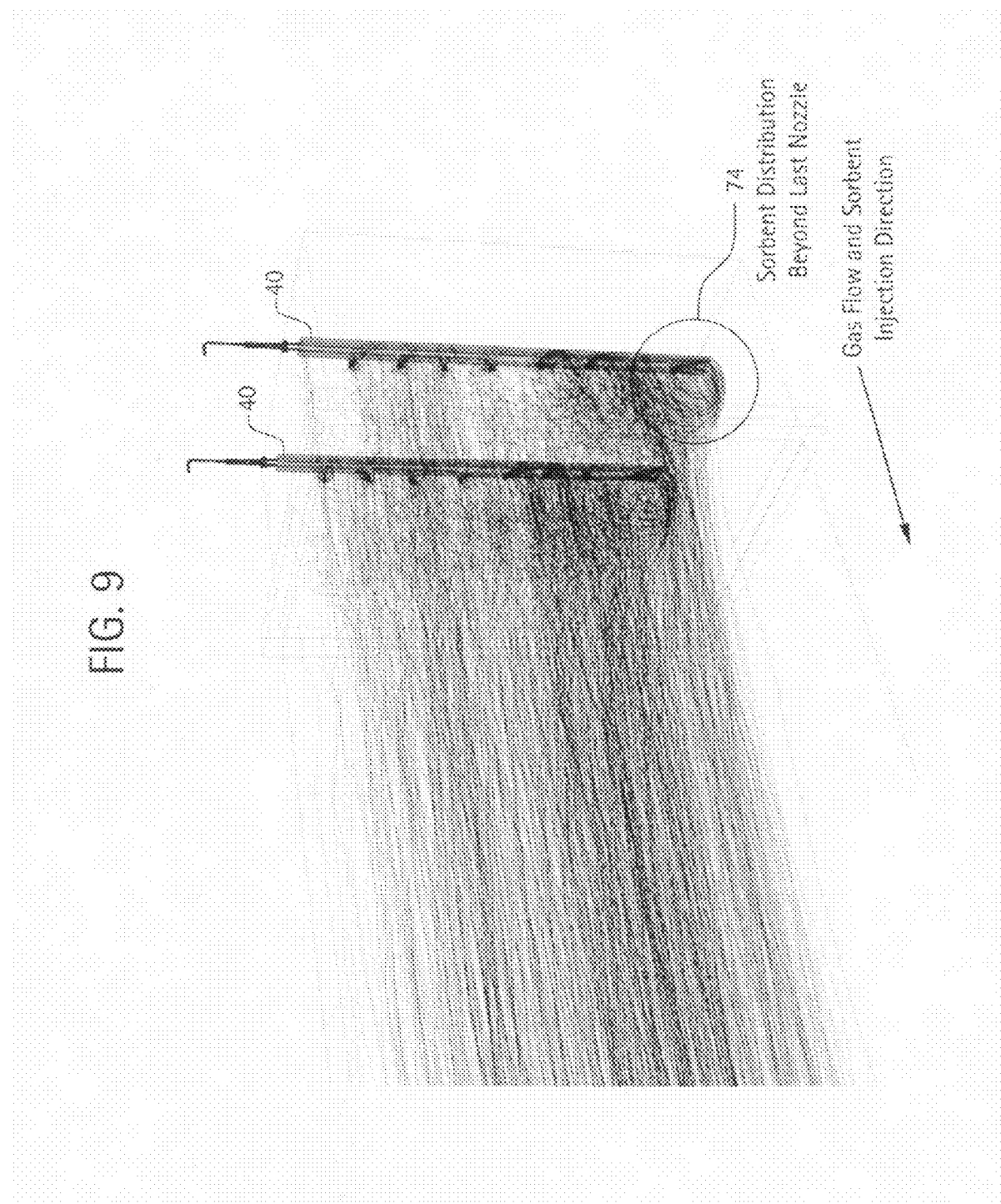
Figure 10:
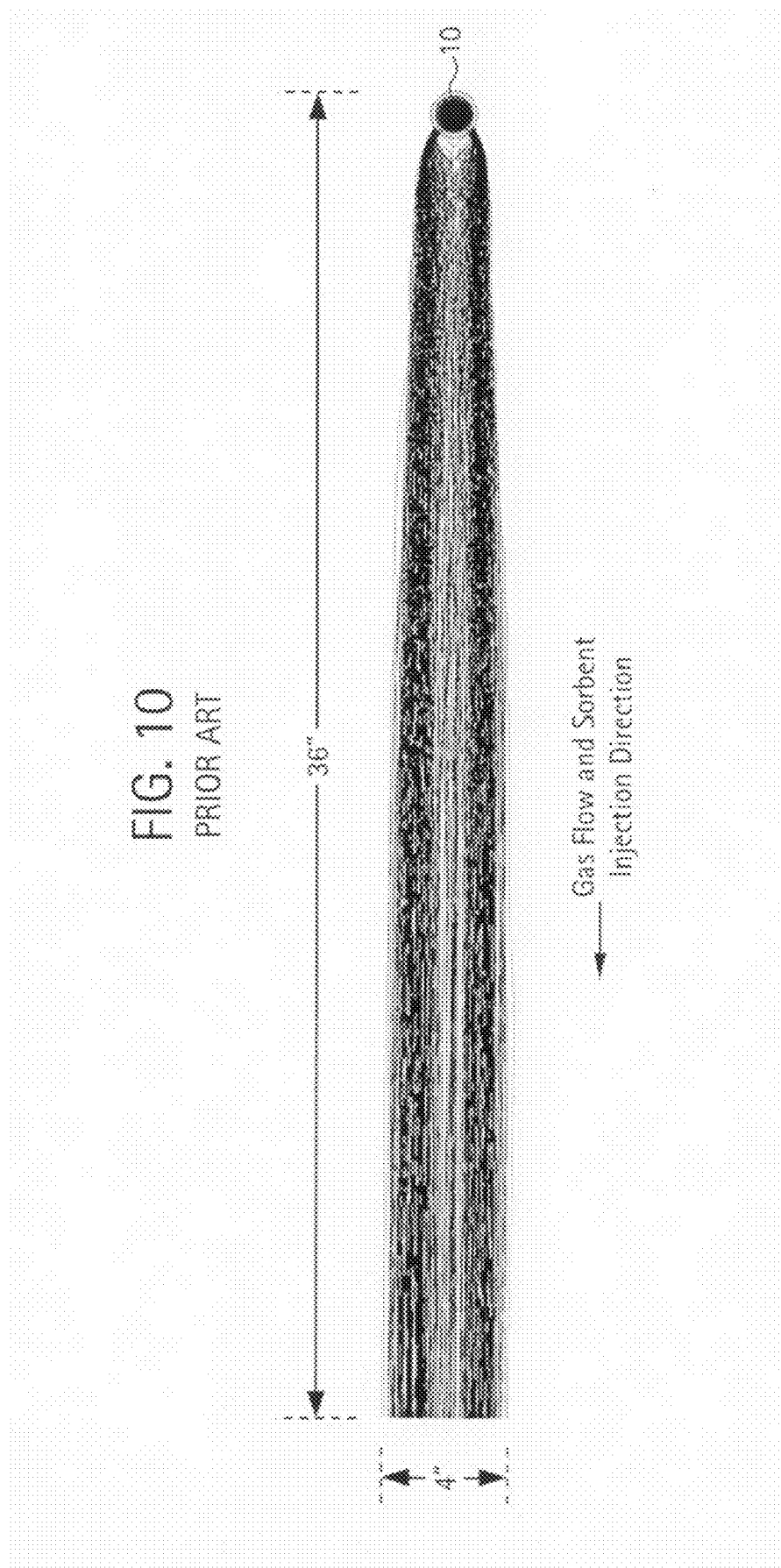
Figure 12A:
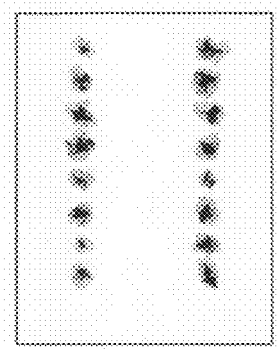
Figure 12B:
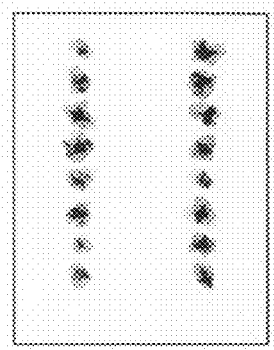
Figure 12C:
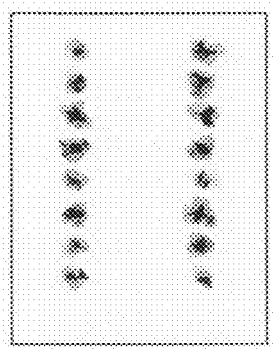
Figure 12D:
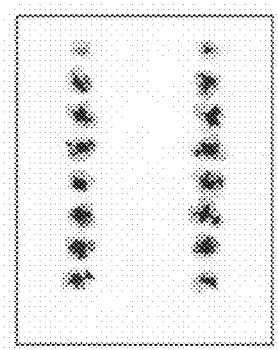
Figure 12E:
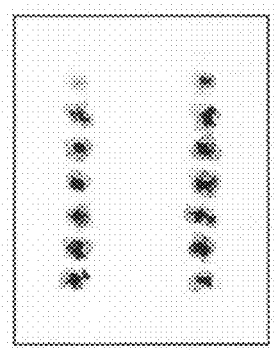
Figure 12F:
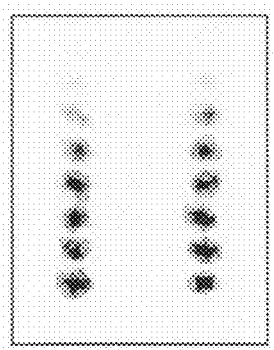
Figure 13A:
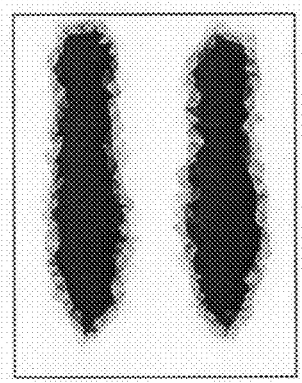
Figure 13B:
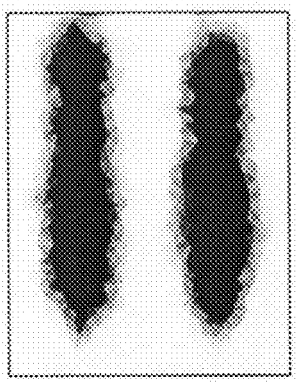
Figure 13C:
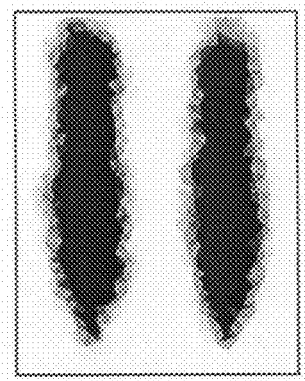
Figure 13D:
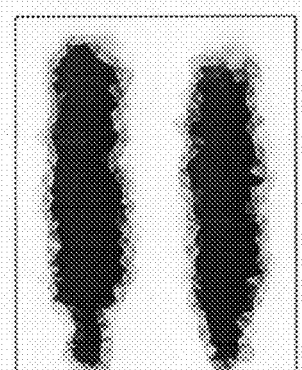
Figure 13E:
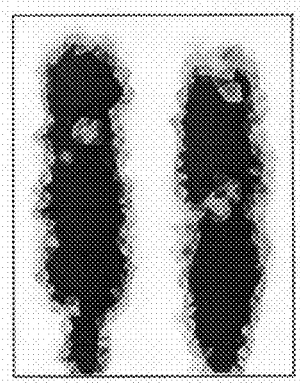
Figure 13F:
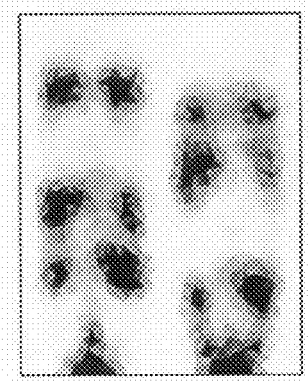
Figure 14A:
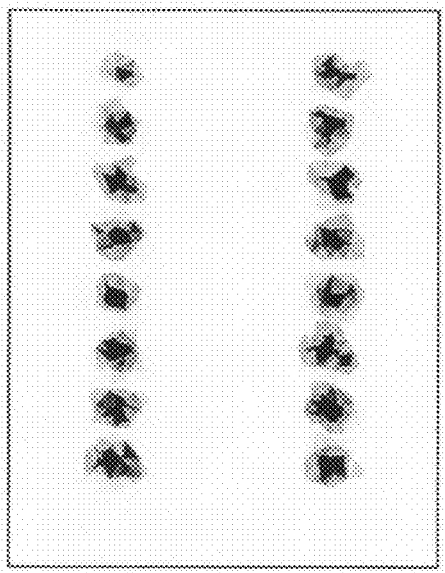
Figure 14B:
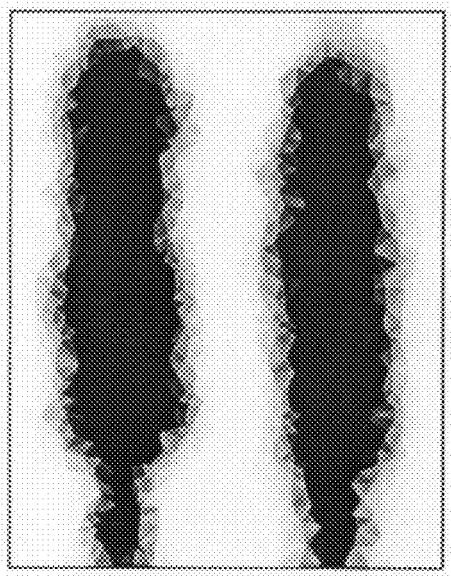
Figure 15:
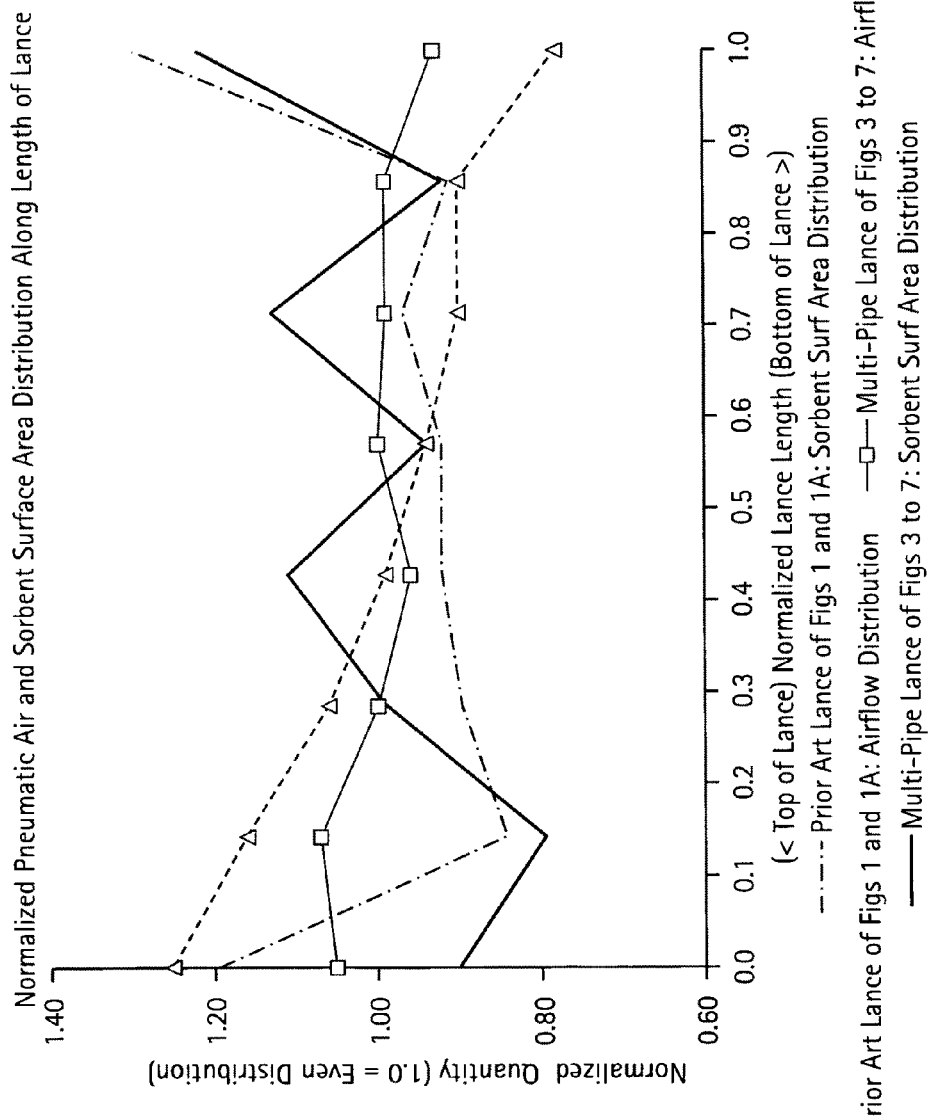

Pneumatic Carrier Air Flow per Lance=15 scfm
Solids Injection Rate per Lance=25.5 lb/hr Thus in FIG. 8 a schematic broken-away perspective view shows typical particle tracks enabled by the prior art apparatus of FIGS. 1 and 1A, where two lances 10 of the prior art type are present in the duct. This is to be compared with the FIG. 9 schematic broken-away perspective view, which shows typical particle tracks enabled by the apparatus of the invention based on two multi-pipe lances 40 of the type depicted in FIGS. 3 through 7 placed side by side in a flue gas duct partition. It will be evident that the prior art arrangement results in the ejected particles moving downstream in narrow distinct, confined and separated bands or columns. Increasing the amount of energy used to eject the particles pushes particles further out from the lance, but still results in columns of particles in the gas path. In contrast, the multi-pipe lances 40 of the present invention by generating increased gas turbulence and recirculation downstream of the lance, rapidly produce a highly intermixed and dispersed cloud of particles, and indeed one that becomes more spread out and dispersed in the surrounding gas as the particles proceed in the downstream direction. As mentioned above, and due to the flue gas flow patterns in the wake of the baffle, the excess length of the baffle 72 (past the last nozzle as seen at 74) serves to distribute additional sorbent beyond the last discharge nozzle. The baffle 72 typically extends below the last nozzle for a distance approximately equal to the distance between successive discharge nozzles.

FIGS. 10 and 11, which are each schematic top plan views of the lance particle tracks, again show the much greater dispersion achieved by use of the invention lance 40 (FIG. 11) as compared with the use in FIG. 10 of the prior art lance 10 of FIGS. 1 and 1A.

The Figures illustrate how the present invention generates a low pressure zone in the area directly behind (downstream) of the lance baffle. The feed discharge nozzles 70 in the present invention are placed within this low pressure zone generated by baffle 72. Positioning the orifices within the low pressure zone provides the added benefit of reducing air pressure requirements if the injected particles are pneumatically conveyed. In addition to the low pressure zone, the lance baffle generates a high-intensity turbulence plume in the gas phase immediately downstream of the lance. It is this turbulence plume that results in the marked improvement in dispersion of the particulate in comparison to the prior art.

FIGS. 12A through 12F schematically depict cross-sectional views taken 10 ft downstream from the prior art lance 10 of FIGS. 1 and 1A, and show distribution of the total surface area of the ejected particles by particle size at the said downstream position. This is to be compared with FIGS. 13A through 13F which schematically depict cross-sectional views taken 10 ft downstream from the multi-pipe lance 40 of the invention as in FIGS. 3 through 7, and which similarly shows distribution of the total surface area of the ejected particles by particle size at the downstream position.

FIG. 14A schematically depicts a cross-sectional view taken 10 ft downstream from the prior art lance 10 of FIGS. 1 and 1A, and shows the distribution of the total surface area of the ejected particles of all particle sizes at the said downstream position. This is to be compared with FIG. 14B showing the same cross-sectional view taken 10 ft downstream from the multi-pipe lance 40 of the invention as in FIGS. 3 through 7, and again showing the distribution of the total surface area of the ejected particles of all particle sizes at the said downstream position. The much wider and taller dispersion of particles in the gas stream achieved by the invention will be evident.

The graphical showing of FIG. 15 depicts the normalized pneumatic carrier air and sorbent surface area distribution along the length of a prior art lance 10 as in FIGS. 1 and 1A, and of a multi-pipe lance 40 of the invention. As already mentioned each discharge nozzle has an orifice opening size sufficiently small enough to balance the pressure drop evenly across the exemplified four separate feed pipes. This serves to ensure that the pneumatic air and sorbent particles it is conveying are allocated relatively evenly between the separate feed pipes. The multi-pipe lance 40 (denoted by a black solid line for surface area distribution and a black solid line with squares for airflow distribution) is seen to perform better than the simple pipe lance 10 because the maximum deviation from 1.0 (where the value 1.0 equates to a completely even distribution) is less than the simple pipe lance for both sorbent surface area and air flow distributions.

While the present invention has been set forth in terms of specific embodiments thereof, it will be appreciated that in view of the present disclosure, numerous variations upon the invention are now enabled to those skilled on the art, which variations yet reside within the present teachings. Accordingly the invention is to be broadly construed, and limited only by the scope and spirit of the disclosure and of the claims now appended hereto.

The invention claimed is:

1. In combination with a fluid treatment system which includes a flow duct in which a fluid stream flowing through the duct is mixed with a treating agent; a dispersion apparatus for dispersing the treating agent into said fluid stream, comprising: a dispersion lance mounted in said duct with its axis approximately transverse to the direction of the fluid stream flow, said lance having a treating agent feed section, and a plurality of parallel pipes extending from said section, each said pipe having one or more feed discharge nozzles along its length for injecting the treating agent supplied to said pipes into the fluid stream; a baffle extending lengthwise along the upstream side of said lance, said baffle being of a uniform cross-section along its length, the cross-section having a V or a rounded first portion the convex surface of which faces upstream of the fluid stream flow, and with generally flattened wing portions extending from the lateral edges of the said first portion to beyond the sides of the multiple pipes where said wing portions transversely intersect the stream flow; the said baffle acting to generate a low pressure zone on the downstream sides of the pipes which enhances turbulence in the fluid; and wherein the discharge nozzles of said pipes are located to inject said treating agent into the said low pressure zone to better distribute and intermix the injected treating agent into the surrounding fluid stream.

2. A combination in accordance with claim 1, wherein said baffle comprises a partial cylinder the convex side of which faces upstream of the fluid stream flow, and with said generally flattened wing portions extending from the lateral edges of the cylinder to beyond the sides of the multiple pipes where they transversely intersect the stream flow.

3. A combination in accordance with claim 2, wherein said cylinder comprises a semi-cylinder.

4. A combination in accordance with claim 3, wherein said fluid comprises a gas.

5. A combination in accordance with claim 4, wherein said treating agent comprises a particulate.

6. A combination in accordance with claim 5, wherein said particulate comprises solid particles.

7. A combination in accordance with claim 6, wherein said gas comprises a flue gas, and said particles comprise a sorbent for components of the flue gas which are sought to be removed.

8. A combination in accordance with claim 6, wherein the said treating agent feed section includes an inlet supply line and a downstream adjoined venturi section which acts to redirect treating agent particles away from the walls of the line downstream of any preceding bends in the inlet supply line, the venturi section thereby ameliorating effects caused by the supply of treating agent not being uniform.

9. A combination in accordance with claim 8, wherein the said treating agent feed section further includes a mixing bar section downstream of the venturi section to generate uniformity in the cross-sectional spread of the particle flow proceeding from the mixing bar section.

10. A combination in accordance with claim 9, wherein the said treating agent feed section further includes a splitter vane section for receiving the flow from said mixing bars for allocating the uniformly-distributed particles from the mixing bars evenly into compartments formed within the splitter vane section which lead into and feed the separate nozzle-feed pipes.

11. A combination in accordance with claim 10, wherein the separate nozzle-feed pipes terminate at differing distances below the said compartments, and wherein the nozzles of each said pipe are at a portion of a said pipe where the nozzle discharges are not impeded by any of the remaining pipes.

12. A combination in accordance with claim 11, wherein the said baffle extends below the last nozzle of said pipes for a distance approximately equal to the distance between successive discharge nozzles, whereby due to the flue gas flow patterns in the wake of the baffle, the excess length of the baffle past the last nozzle serves to distribute additional said particles beyond the last discharge nozzle.

13. A combination in accordance with claim 11, wherein the said feed pipes contain from one to four nozzles.

14. The combination of claim 1, wherein said wings have a generally rectangular shape.

15. The combination of claim 14, wherein said wings are provided with notches on their trailing edges.

16. In a fluid treatment system which includes a flow duct in which a fluid stream flowing through the duct is mixed with a treating agent; a method for dispersing the treating agent into said fluid stream, comprising: mounting a dispersion lance in said duct with its axis approximately transverse to the direction of the fluid stream flow, said pipe having a feed section for said treating agent and a plurality of parallel pipes extending from said feed section, each said pipe having a series of nozzles along its length for injecting said treating agent supplied to said pipe into the fluid stream; a baffle extending lengthwise along said lance, said baffle being formed as a partial cylinder, the concave side of the cylinder facing upstream of the fluid stream flow, and with generally flattened wing portions extending from the lateral edges of the cylinder to beyond the sides of the multiple pipes where said wing portions transversely intersect the stream flow; the said baffle acting to generate a low pressure zone on the downstream sides of the pipes which enhances turbulence in the fluid; and wherein the nozzles of said pipes are located to inject said treating agent into the said low pressure zone to better distribute and intermix the injected treating agent into the surrounding fluid stream.

17. A method in accordance with claim 16, wherein said fluid comprises a gas.

18. A method in accordance with claim 17, wherein said treating agent comprises a particulate.

19. A method in accordance with claim 18, wherein said particulate comprises solid particles.

20. A method in accordance with claim 19, wherein said gas comprises a flue gas, and said particles comprise a sorbent for components of the flue gas sought to be removed.

21. A method in accordance with claim 19, wherein said treating agent comprises a liquid.

22. A method in accordance with claim 19, wherein said treating agent comprises a gas.

23. A method in accordance with claim 16, wherein said fluid comprises a liquid.

24. A method on accordance with claim 23, wherein said treating agent comprises a particulate.

25. A method in accordance with claim 24, wherein said particulate comprises solid particles.

26. A method in accordance with claim 23, wherein said treating agent comprises a liquid.

27. A method in accordance with claim 23, wherein said treating agent comprises a gas.

28. A method in accordance with claim 16, wherein said wings are provided with notches on their trailing edges.

29. In combination with a fluid treatment system which includes a flow duct in which a fluid stream flowing through the duct is mixed with a treating agent; a dispersion apparatus for dispersing the treating agent into said fluid stream, comprising: a dispersion lance mounted in said duct with its axis approximately transverse to the direction of the fluid stream flow, said lance having a plurality of parallel treating agent feed pipes, each said pipe having one or more feed discharge nozzles along its length for injecting treating agent supplied to said pipes into the fluid stream; feed means for supplying said treating agent to said pipes; a baffle extending lengthwise along the upstream side of said lance, said baffle being of a uniform cross-section along its length, the cross-section having a V-shaped or a rounded first portion the convex surface of which faces upstream of the fluid stream flow, and with generally flattened wing portions extending from the lateral edges of the said first portion to beyond the sides of the multiple pipes where said wing portions transversely intersect the stream flow; the said baffle acting to generate a low pressure zone on the downstream sides of the pipes which enhances turbulence in the fluid; and wherein the discharge nozzles of said pipes are located to inject said treating agent into the said low pressure zone to better distribute and intermix the injected treating agent into the surrounding fluid stream.

30. A combination in accordance with claim 29, wherein the said pipes are fed from a common supply at said lance.

31. A combination in accordance with claim 29, wherein said baffle comprises a partial cylinder the convex side of which faces upstream of the fluid stream flow, and with said generally flattened wing portions extending from the lateral edges of the cylinder to beyond the sides of the multiple pipes where they transversely intersect the stream flow.

32. A combination in accordance with claim 31, wherein said cylinder comprise a semi-cylinder.

33. A combination in accordance with claim 29, wherein the said feed pipes each contain from one to four nozzles.

\* \* \* \* \*